United States Patent [19]

Ohkita

[11] Patent Number: 4,785,365
[45] Date of Patent: Nov. 15, 1988

[54] DOOR ASSEMBLY WITH INNER SHUTTER FOR CLOSING OPENING FOR CARTRIDGE INSERTION IN DISK DRIVE DEVICE

[75] Inventor: Masao Ohkita, Furukawa, Japan

[73] Assignee: Alps Electric Co., Ltd., Japan

[21] Appl. No.: 17,474

[22] Filed: Feb. 20, 1987

[30] Foreign Application Priority Data

Jun. 14, 1986 [JP] Japan .................. 61-137292

[51] Int. Cl.⁴ ............................................. G11B 5/012
[52] U.S. Cl. ...................................... 360/97; 360/96.5
[58] Field of Search ................. 360/97.99, 96.1, 96.5, 360/96.6, 93, 137

[56] References Cited

U.S. PATENT DOCUMENTS

| 4,628,383 | 12/1986 | Miyamoto | 360/96.5 |
| 4,680,654 | 7/1987 | Shibuya | 360/96.5 |
| 4,691,257 | 9/1987 | Tagochi | 360/97 |

FOREIGN PATENT DOCUMENTS

58-108003  6/1983  Japan ................... 360/96.5

*Primary Examiner*—John H. Wolff
*Attorney, Agent, or Firm*—Guy W. Shoup; Leighton K. Chong; Paul J. Winters

[57] ABSTRACT

A door assembly for a device for driving a recording medium has a panel defining an opening through which the device can be loaded with a recording medium or unloaded. A door is rotatably supported on the inside of the panel. A pair of springs are associated with the door for urging it in a direction in which it is rotated to close the opening. A shutter is slidably supported on the inside of the panel for closing the opening when the device has been loaded with a recording medium. A pair of levers are rotatably supported on the panel and are adapted for simultaneous rotation. Each lever has a first end connected to the shutter and a second end which is engageable by the recording medium for rotation in a direction in which its first end is rotated to move the shutter in a first direction in which it closes the opening. Another spring is connected between the levers for urging the first ends thereof in a direction in which they move the shutter in a second direction in which it clears the opening.

6 Claims, 7 Drawing Sheets

FIG.14 PRIOR ART

DOOR ASSEMBLY WITH INNER SHUTTER FOR CLOSING OPENING FOR CARTRIDGE INSERTION IN DISK DRIVE DEVICE

BACKGROUND OF THE INVENTION

1. Field of the Invention

This invention relates to a door assembly which is provided in a recording and reproducing apparatus for closing an opening through which it is loaded with a recording medium.

2. Description of the Prior Art

There is known an external storage device for storing data or programs which can be used in a central processing unit. The device is under the control of the central processing unit, but is not necessarily combined therewith permanently. More specifically, there is, for example, a disk drive device which rotates a magnetic or optical information recording medium in the form of a disk for recording or reproducing information. A small disk drive device is mainly used for a personal computer or a word processor. There is also a smaller device which is used for driving a still video floppy disk.

Figure 13:
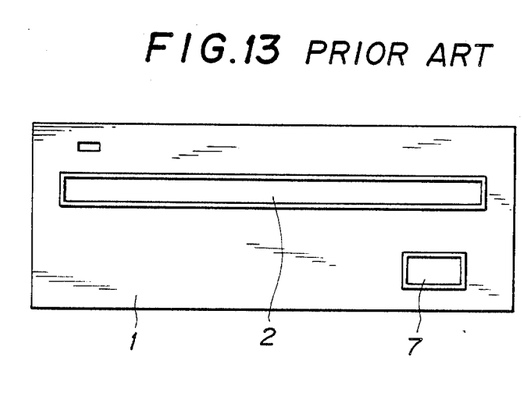
FIG. 13 is a front elevational view of a front panel of the type known in the art.
Figure 14:
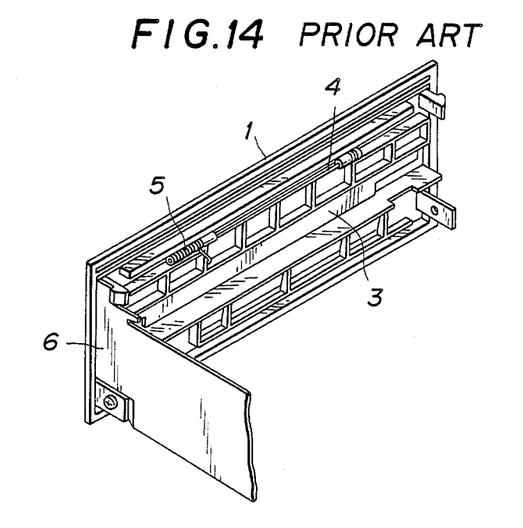
FIG. 14 is a perspective view of the front panel shown in FIG. 13 and a sidewall to which it is connected.

A system in which a disk drive device is incorporated usually has a front panel of the type which is shown by way of example at 1 in FIGS. 13 and 14. The front panel 1 has a slot 2 through which a disk cartridge, i.e. a hard case containing, for example, a magnetic disk is inserted. A swinging door 3 is provided behind the slot 2 as shown in FIG. 14. The door 3 is rotatably supported on a shaft 4 extending horizontally along the upper edge of the slot 2. A spring 5 is provided on the shaft 4 for urging the door 3 downwardly so that it may close the slot 2. The front panel 1 is usually supported on a sidewall 6 of the disk drive device, or on that portion of a system housing in which the disk drive device is mounted. The front panel 1 also has a hole 7 (FIG. 13) through which an eject lever not shown projects from the disk drive device.

The door 3 is provided for closing the slot 2 to shut out dust when the disk drive device is not used. When the device is loaded with a disk cartridge, the door 3 can be pushed open by the cartridge. When the device has been loaded, however, the lower edge of the door 3 rests on the disk cartridge and is not lowered to the level which enables the closure of the slot 2. Therefore, there is every likelihood that dust may enter the disk drive device as long as it contains the cartridge.

This problem ca be overcome if the disk cartridge which has been inserted through the slot 2 can be lowered to a level which enables the door 3 to swing to its closed position. However, an increase in height of the device is required to provide a space in which the disk cartridge can be satisfactorily lowered and a mechanism which is required for lowering the cartridge complicates the device. These factors are undesirable from the standpoints of compactness in construction and cost reduction. There is another problem, even if the door can be closed when a disk cartridge has been placed in the disk drive device. When the door is in its closed position, it is impossible to know if the device contains a disk cartridge. There is every likelihood of erroneous operation. These problems are particularly prominent with respect to a still video camera, a cassette deck or compact disk drive unit for use in a vehicle, etc. Therefore, there has been a strong demand for a device which is highly dustproof and free from any possibility of erroneous operation irrespective of the environment in which it is used.

SUMMARY OF THE INVENTION

Under these circumstances, it is an object of this invention to provide a door assembly which can completely close an opening through which a disk cartridge is inserted and loaded in a disk drive device, and which makes it possible to recognize the presence of a recording medium in the device.

This object is attained by a door assembly for a disk drive device comprising a member defining an opening through which the cartridge is inserted and loaded, a door member supported rotatably on the inside of the opening defining member, a first means for urging the door member in a direction in which it is closed, a shutter member supported slidably on the inside of the opening defining member for closing the opening when the cartridge is inserted, a lever supported rotatably on the opening defining member and having one end which is engageable with the cartridge, while the other end of the lever engages the shutter member, and a second urging means for urging at least the shutter member in a direction in which it is opened.

The door member is pushed open by a cartridge to enable its insertion into a drive device. When the cartridge has been placed completely inwardly of the opening defining member, it engages one end of the lever and causes it to rotate so that the other end thereof engaging the shutter member may be moved along the inside of the opening defining member until the shutter member closes the opening completely. When the cartridge is unloaded, the lever is caused by the second urging means to rotate in the opposite direction upon disengagement of the recording medium from one end of the lever, so that the shutter member may be moved back to open the opening. The door member is moved by the first urging means to close the opening upon ejection of the recording medium therethrough.

As is obvious from the foregoing, the opening is closed by the door member when the cartridge is not inserted in the device, and by the shutter member when cartridge is inserted in the device. The opening is left open only when the as the cartridge is being inserted. Therefore, it is possible to minimize the amount of dust or other foreign matter which enters the device through the opening.

If the door member can be seen through the opening, it means that the device contains no cartridge. If the door and shutter members are colored differently from each other, it is possible to ensure a still easier recognition thereof and thereby the still greater freedom of the device from any possibility of erroneous operation.

Other features and advantages of this invention will become apparent from the following description and the accompanying drawings.

DETAILED DESCRIPTION OF THE INVENTION

A door assembly embodying this invention is shown by way of example in FIGS. 1(a) to 12. It is a door assembly for a small still video floppy disk drive device. The door assembly essentially comprises a opening defining member or front panel 1A, a door 3A, a shutter 7A and a pair of levers 8.

Figure 4:
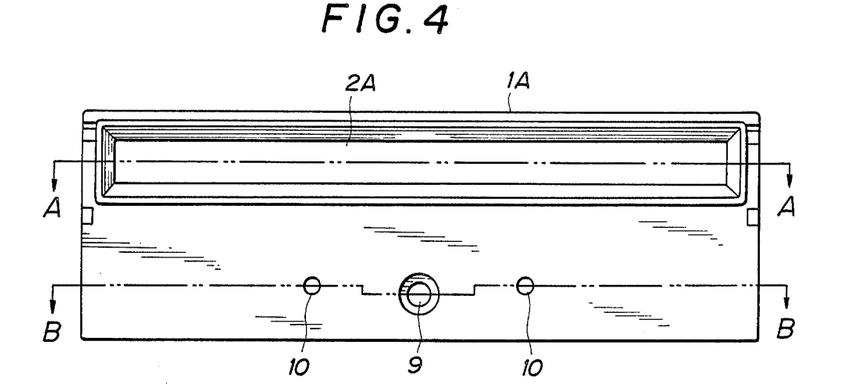
FIG. 4 is a front elevational view of a front panel.
Figure 5:
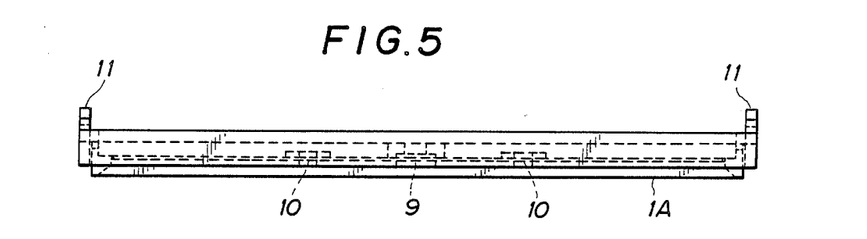
FIG. 5 is a top plan view of the front panel.
Figure 6:
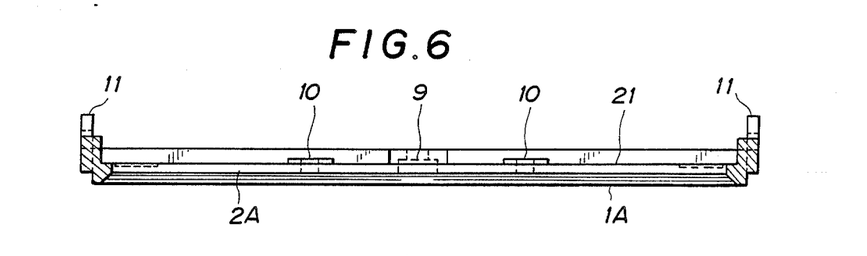
FIG. 6 is a sectional view taken along the line A—A of FIG. 4.
Figure 7:
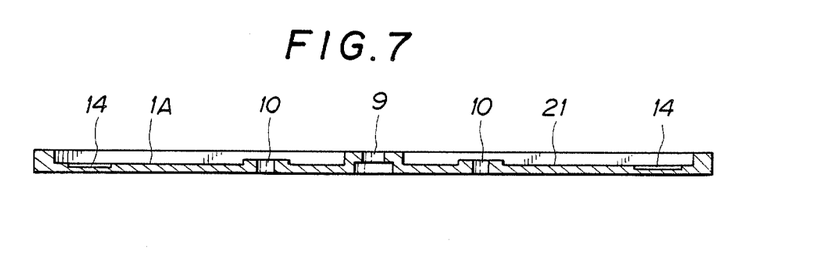
FIG. 7 is a sectional view taken along the line B—B of FIG. 4.
Figure 8:
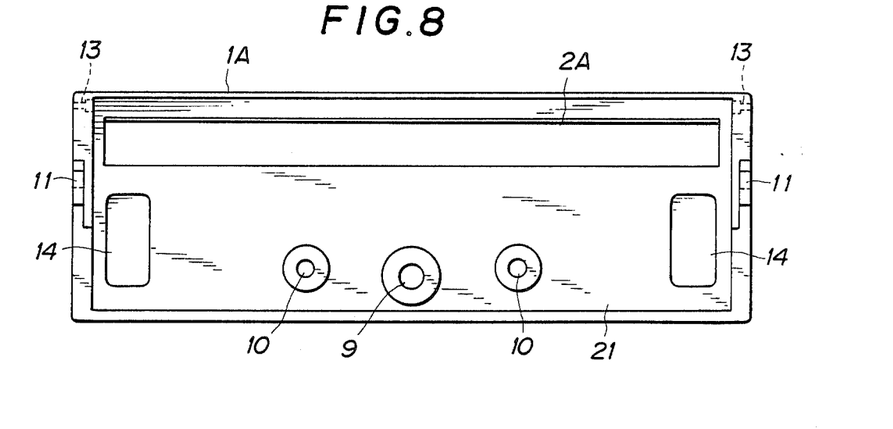
FIG. 8 is a rear elevational view of the front panel.
Figure 9:
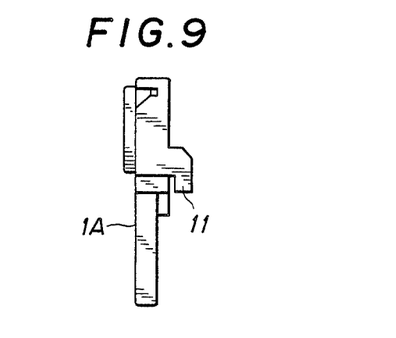
FIG. 9 is a right side elevational view of the front panel shown in FIG. 8.

The front panel 1A has a cartridge loading and unloading opening 2A in the form of a slot extending along its upper edge, a mounting hole 9 provided centrally near its lower edge for receiving therethrough a screw for connecting the front panel 1A to the disk drive device and a pair of pin receiving holes 10, as shown in FIGS. 4 and 8. The front panel 1A has a pair of side edges which are shorter than its upper and lower edges and perpendicular thereto. Each side edge has a projection 11 which is used for connecting the front panel 1A to the sidewall of the drive device. Adjacent to its upper edge above the opening 2A, the front panel 1A has a pair of holes 13 in which a shaft 4A is supported for supporting the door 3A rotatably. The front panel 1A is also provided on its rear or inner side near its side edges with a pair of grooves 14 for receiving the levers 8 rotatably, as shown in FIGS. 7 and 8.

Figure 1A:
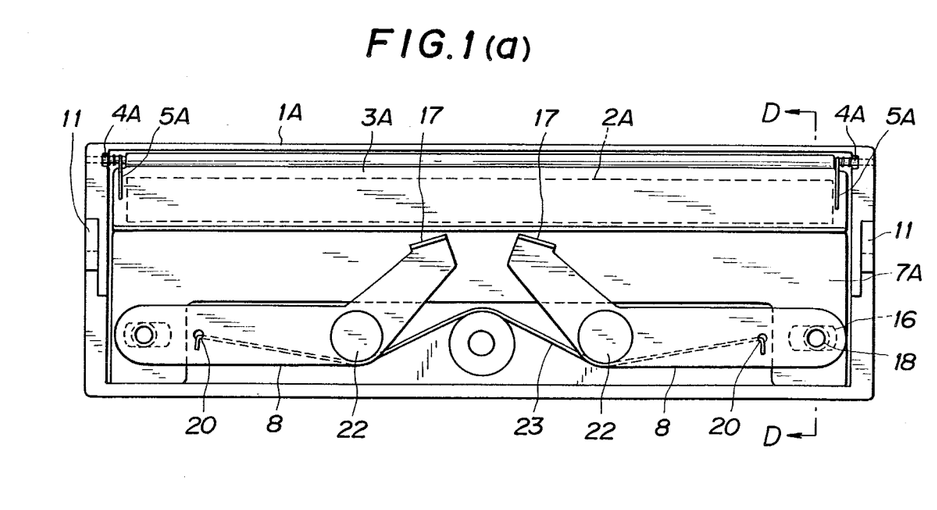
FIGS. 1(a), 2(a) and 3(a) are a series of rear elevational views of a door assembly embodying this invention showing it in different operational positions.
Figure 1B:
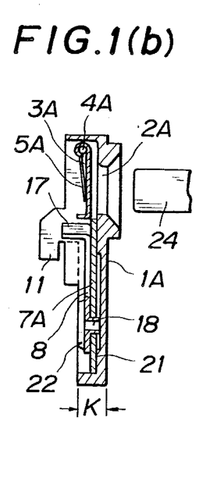
FIGS. 1(b), 2(b) and 3(b) are sectional views taken along the lines D—D, E—E and F—F of FIGS. 1(a), 2(a) and 3(a), respectively.
Figure 2A:
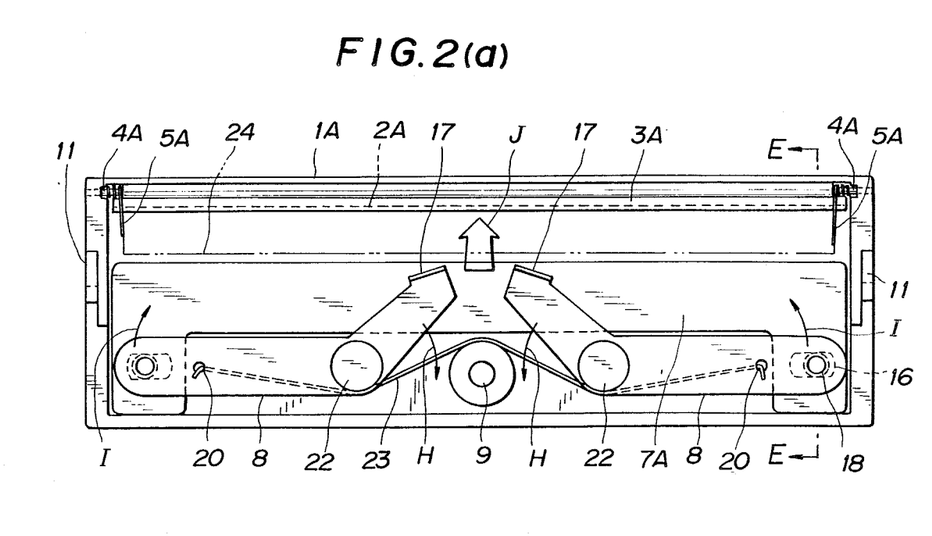
Figure 3A:
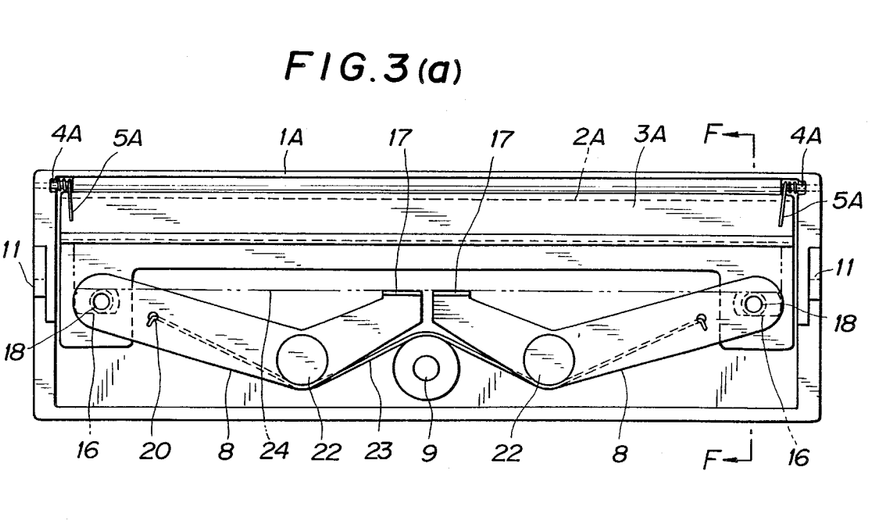

The door 3A is generally rectangular and somewhat larger than the opening 2A, as shown in FIGS. 1(a), 2(a) and 3(a). The door 3A has an upper edge at which it is rotatably supported on the shaft 4A. A pair of springs 5A are provided between the door 3A and the shaft 4A for urging the door 3A in the direction in which it is closed, i.e. counterclockwise as viewed in FIG. 1(b).

Figure 10:
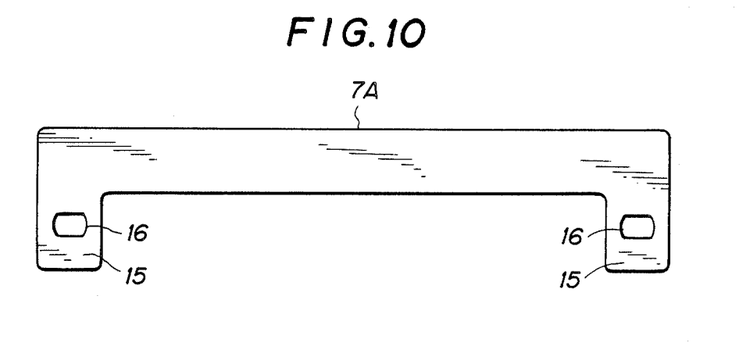
FIG. 10 is a front elevational view of a shutter.

The shutter 7A is substantially an inverted U-shaped plate and has a pair of depending legs 15 each formed with a hole 16 in which one of the levers 8 is engageable, as shown in FIG. 10.

Figure 11:
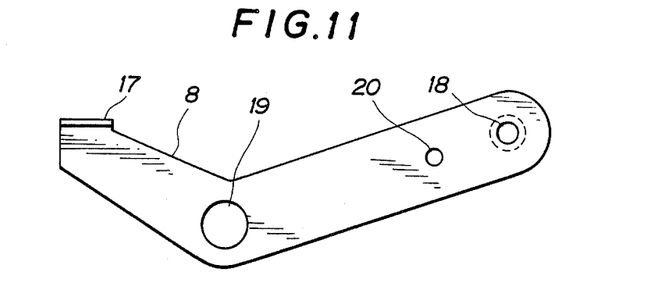
FIG. 11 is a front elevational view of a lever.
Figure 12:
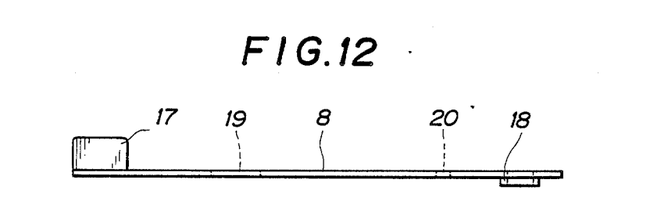
FIG. 12 is a bottom plan view of the lever.

Each of the levers 8 is substantially shaped like the deformed letter V, as shown in FIG. 11. Each lever 8 has one end formed with a laeeral projection 17 with which a disk cartridge is engageable when it has been inserted through the opening 2A, and another end provided with a projection 18 which is engageable in one of the holes 16 of the shutter 7A, as shown in FIGS. 11 and 12. The projections 17 and 18 extend in the mutually opposite directions, as shown in FIG. 12. The lever 8 has a pin receiving hole 19 in its bent middle portion. It also has near the projection 18 a smaller hole 20 for fastening a spring at one end thereof as will hereinafter be described in further detail.

The door 3A is located inwardly of the opening 2A and is normally kept in its closed position, as shown in FIGS. 1(a) and 1(b). The shutter 7A is positioned adjacent to the inner surface 21 of the front panel 1A below the opening 2A and the door 3A. Each lever 8 is rotatably connected to the front panel 1A by a pin 22. The shutter 7A is slidably disposed between the inner surface 21 of the front panel 1A and the levers 8. Each lever 8 is rotatably supported on the pin 22 extending through its hole 19 and one of the holes 10 of the front panel 1A. The projection 18 of the lever 8 is engaged in one of the holes 16 of the shutter 7A. The levers 8 and the shutter 7A form a link mechanism which converts the rotary motion of the levers 8 to the linear reciprocative motion of the shutter 7A. The projections 18 project into the grooves 14 of the front panel 1A and do not contact its inner surface 21.

The spring 23 extends between the holes 20 of the levers 8 and urges the outer ends thereof, which are provided with the projections 18, away from the opening 2A to thereby hold the shutter 7A in its open position.

Figure 2B:
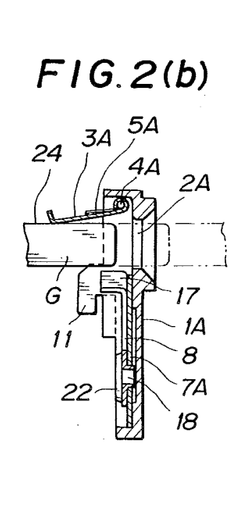
Figure 3B:
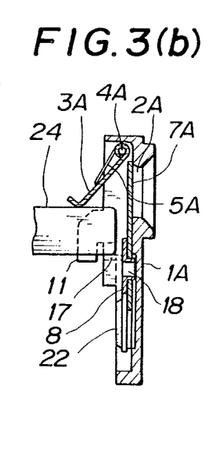

FIGS. 1(a) to 3(b) show the different positions of the door assembly. FIGS. 1(a) and 1(b) show the position which it takes when the disk drive device does not contain any disk cartridge. FIGS. 2(a) and 2(b) show the position which it takes when the device is being loaded with a disk cartridge or unloaded. FIGS. 3(a) and 3(b) show the position which it takes when the disk cartridge has been correctly positioned in the device.

The door 3A is in its totally closed position and the shutter 7A in its totally open position before a disk cartridge 24 is inserted into the device, as shown in FIGS. 1(a) and 1(b). The outer ends of the levers 8 at which the projections 18 are provided are in their lowermost positions and the inner ends thereof, at which the projections 17 are provided, are in their closest proximity to the opening 2A. The holder of the disk drive device, not shown, is in its remotest position from a turntable.

The disk cartridge 24 can be inserted into the disk drive device through the opening 2A by pushing the door 3A open, as shown in FIG. 2(b). If it reaches a predetermined depth, a locking device not shown is released to allow the movement of a sliding plate for moving the cartridge holder vertically. Then, the disk cartridge 24 is automatically moved by a mechanism not shown to its deepest position relative to the holder, as shown at G in FIG. 2(b), whereupon the holder is lowered substantially vertically toward the turntable by the engagement of a projection on its sidewall with a known cam groove and a known guide groove. The rear end of the disk cartridge 24, or the end which is close to the opening 2A, contacts the projections 17 of the levers 8 and causes them to rotate downwardly as shown by arrows H in FIG. 2(a). Therefore, the outer ends of the levers 8, at which the projections 18 are provided, are rotated upwardly as shown by arrows I in FIG. 2(a) to cause the upward sliding movement of the shutter 7A along the inner surface 21 of the front panel 1A as shown by an arrow J in FIG. 2(a) to close the opening 2A as shown in FIGS. 3(a) and 3(b). The shutter 7A is located between the front panel 1A and the door 3A resting on the disk cartridge 24 and staying in its half-open position.

If an eject lever not shown is actuated after the disk drive device has been used for recording or reproducing purposes, the cartridge holder is raised away from the turntable and the disk cartridge and the door assembly is brought back from their position shown in FIGS. 3(a) and 3(b) to their position shown in FIGS. 2(a) and 2(b). The projections 17 of the levers 8 are raised in the direction opposite the direction indicated by the arrows H in FIG. 2(a) and the shutter 7A is lowered in the direction opposite the direction indicated by the arrow J, whereupon the opening 2A is fully opened. The disk cartridge 24 which has been brought back to its position shown at G in FIG. 2(b) is ejected from the disk drive device through the opening 2A by a mechanism not shown, whereupon the door 3A is rotated by the springs 5A to close the opening 2A.

The opening 2A is closed by the swinging door 3A or the sliding shutter 7A, both when the disk drive device contains a disk cartridge and when not. Therefore, the door assembly can minimize the amount of dust or other foreign matter entering the device. The door 3A and the shutter 7A can be colored differently from each other to make it easier to ascertain visually if the disk drive device contains a disk cartridge or not and thereby ensure the avoidance of any erroneous operation. As the shutter 7A is of the sliding type, it can be accommodated in a very small space. For example, the front panel 1A as hereinabove described, in which the shutter 7A can be fully accommodated, has a thickness K (FIG. 1(b)) of only 2 mm. It is the front panel of the door assembly for a still video floppy disk drive device.

While the front panel 1A has been described as being attached to the sidewall 6A of the disk drive device, it is alternatively possible to attach it to the housing of an entire system. Moreover, it is possible to connect the door 3A, shutter 7A, levers 8, etc. to the inner surface of the housing. It is also to be understood that other modifications or variations may be easily made by anybody of ordinary skill in the art without departing from the scope of this invention which is defined by the appended claims.

What is claimed is:

1. A door assembly for a disk drive device of the type having a housing, front panel arranged upright in a vertical direction and provided with a transverse opening through which a disk cartridge is inserted by its leading end along a horizontal direction rearwardly into the housing to a full insertion position at which the trailing end of the cartridge is disposed within the housing spaced from an inner side of the front panel, and loading means for moving the cartridge vertically downward from the full insertion position to a loading position in the housing for recording and reproducing operations and then vertically upwardly for unloading and ejecting the cartridge from the housing, wherein said door assembly comprises:

a door member supported rotatably on a transverse upper edge defining said opening in the vertical direct ion for closing said opening when no cartridge is inserted for opening inwardly in said housing by abutment with the leading end of a cartridge being inserted therein;

first urging means for normally biasing said door member in a direction toward closing said opening;

a shutter member arranged upright in the vertical direction in parallel with said front panel and supported for sliding movement along the inner side of said front panel between a lowered positon below a transverse lower edge defining siad opening and a raised position closing said opening;

lever means pivotally supported on the inner side of said front panel having a flat shape arranged in parallel with said shutter member, said lever means including a first end connected to a poriton of said shutter member for raising and lowering it reciprocally in the vertical direction, and a second end having a horizontally extending projection which is engaged by the trailing end of the cartridge when the cartridge is moved vertically downward and released from engagement with the cartridge when the cartridge is moved upward; and second urging means for normally biasing said lever means in a direction toward lowering said shutter member and opening said opening, whereby said opening is closed by said shutter member when the cartridge is moved vertically downward and engages said projection on said second end of said lever means to pivot said first end to raise said shutter member, and said opening is opening is opened when the cartridge is moved vertrically upward and released from engagement with said second end of said lever means so that said shutter member is lowered by said second urging means.

2. A door assembly as set forth in claim 1, wherein and said door member is substantially a rectangular plate having an upper edge supported rotatably on a shaft extending along said upper edge of said panel and supported thereon above said opening while said shutter member is provided between said opening and said lower edge of said panel.

3. A door assembly as set forth in claim 2, wherein said lever means comprises a pair of levers supported rotatably on said panel and adapted for rotation together, each of said levers having a first portion and a second portion which extends from said first portion at an angle thereto and is located on the opposite side of the axis of rotation of said each lever from said first portion, said first portion having an end defining said first end of said lever means, while said second portion has an end defining said second end of said lever means and located near said opening, said second portions of said levers facing each other.

4. A door assembly as set forth in claim 3, wherein said shutter member has a rectangular portion adapted for closing said opening and a pair of legs located adjacent to said lower edge of said panel, said end of said first portion of each of said levers being connected to one of said legs.

5. A door assembly as set forth in claim 4, wherein said second urging means is a spring having a pair of ends fastened to said first portions of said levers, respectively, for pulling said first portions toward said lower edge of said panel.

6. A door assembly as set forth in claim 5, wherein said first urging means comprises a pair of springs connected between said door member and said shaft for urging said door member toward said opening.

* * * * *

UNITED STATES PATENT AND TRADEMARK OFFICE
CERTIFICATE OF CORRECTION

PATENT NO. : 4,785,365
DATED : November 15, 1988
INVENTOR(S) : Massao Ohkita

It is certified that error appears in the above-identified patent and that said Letters Patent is hereby corrected as shown below:

In the References Cited, "Tagochi" should read --Taguchi--.

Col. 5, line 48, "upwardly" should read --upward--.

Col. 5, line 53, "direct ion" should read --direction--.

Col. 6, line 1, "siad" should read --said--.

Col. 6, line 27, "wherein" should read --wherein said opening is a rectangular slot,--.

Signed and Sealed this

Eighteenth Day of April, 1989

*Attest:*

DONALD J. QUIGG

*Attesting Officer*      *Commissioner of Patents and Trademarks*